B. E. STAVER.
VALVE MECHANISM FOR INTERNAL COMBUSTION ENGINES.
APPLICATION FILED JAN. 4, 1916.

1,230,613.  
Patented June 19, 1917.  
2 SHEETS—SHEET 1.

Witnesses  
Inventor  
B. E. Staver,  
By Victor J. Evans  
Attorney

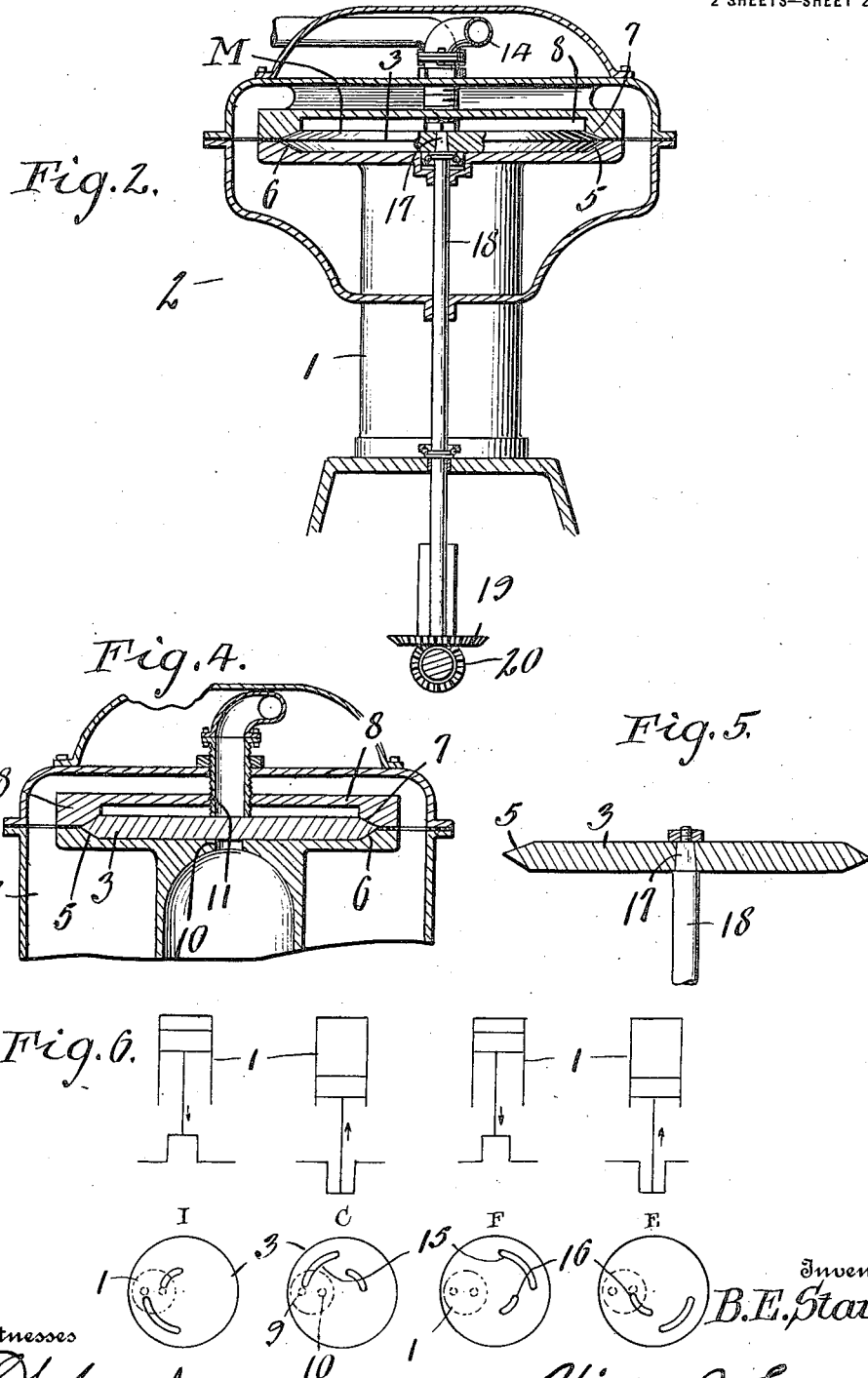

UNITED STATES PATENT OFFICE.

BYRON E. STAVER, OF VIRGINIA, MINNESOTA.

VALVE MECHANISM FOR INTERNAL-COMBUSTION ENGINES.

1,230,613. Specification of Letters Patent. Patented June 19, 1917.

Application filed January 4, 1916. Serial No. 70,091.

*To all whom it may concern:*

Be it known that I, BYRON E. STAVER, a citizen of the United States, residing at Virginia, in the county of St. Louis and State of Minnesota, have invented new and useful Improvements in Valve Mechanism for Internal-Combustion Engines, of which the following is a specification.

This invention relates to improvements in rotary disk valves for internal combustion engines, and has for its primary object the provision of a structure wherein one disk valve is utilized to control two adjacent cylinders.

Another object of the invention is the provision of a valve mechanism wherein the disk will be housed and protected from excessive heat generated by the explosion of the charges of gas.

A further object of the invention is the provision of a structure wherein the operating mechanism is protected on all sides by the water jacket so that the injurious effect of expansion due to excessive heat is overcome.

A still further object of the invention is the provision of a valve mechanism wherein the wearing of the parts is minimized and the upward thrust created by the operating gears is utilized to produce a tight joint between the rotating valve disk and the exhaust and intake pipes.

The invention consists in the features of construction, combination and arrangement of parts, hereinafter fully described and claimed, reference being had to the accompanying drawings, in which:—

Fig. 2 is a cross section on line 2—2 of Fig. 1.

Fig. 4 is a detail section on line 4—4 of Fig. 1.

Fig. 5 is a detail section through the valve disk showing its connection with the valve stem.

Fig. 6 is a diagrammatic view showing the operation of the valve.

Figure 1:
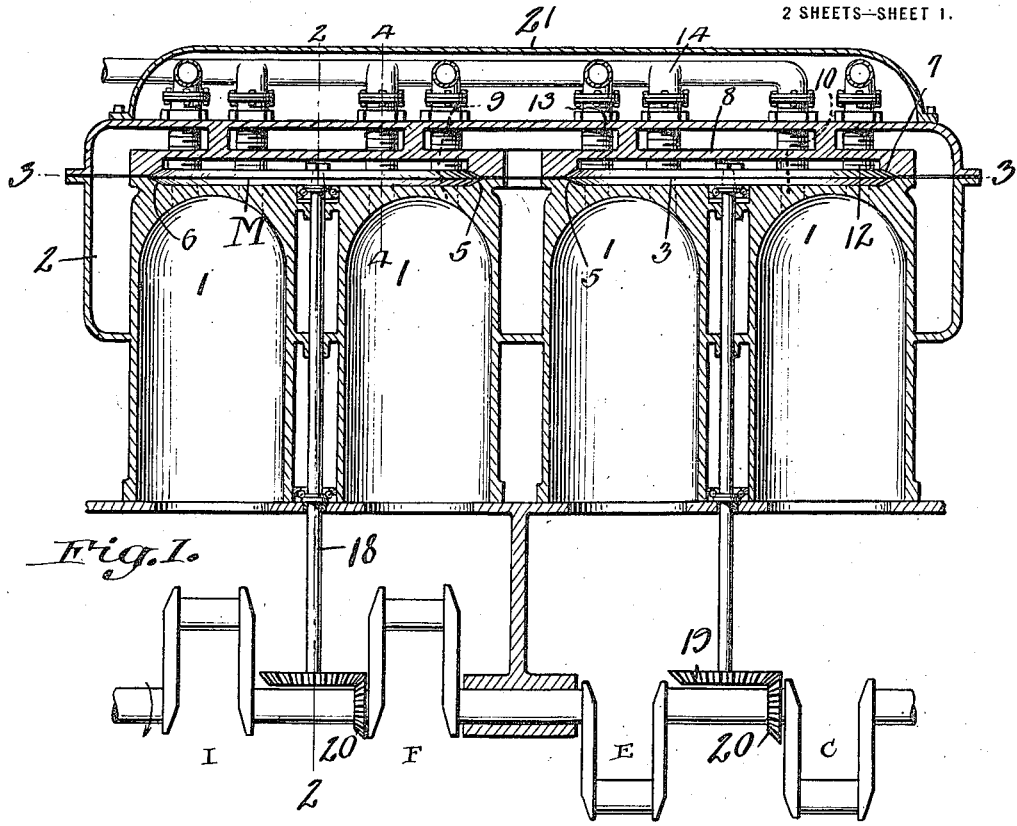
Figure 1 is a longitudinal section through the upper portion of the four cylinder engine showing my invention applied thereto.
Figure 3:
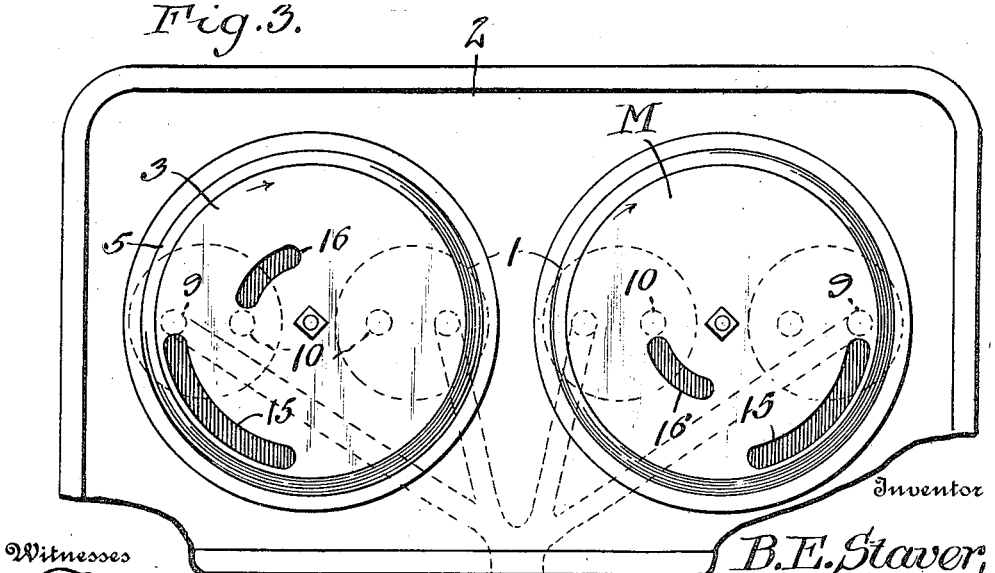
Fig. 3 is a longitudinal section on line 3—3 of Fig. 1.

Referring to the drawing, the numeral 1 designates the cylinders of the internal combustion engine which are surrounded by the water jackets 2 in the usual manner. My valve mechanism is designated by the letter M and comprises a disk 3 having its marginal edge beveled as shown at 5, so as to closely contact with the walls 6 and 7 formed on the upper portion of the cylinders 1 and the under surface of a plate 8 respectively.

This plate 8 holds the disk in tight engagement with the upper surface of the cylinders 1 so as to prevent leakage around the intake and exhaust ports 9 and 10 of the cylinders. The plate is provided with a series of circular openings 11 through which pass intake and exhaust pipes 13 and 14 which bear upon the upper surface of the disk for accomplishing a tight fit so as to prevent escapement of gas into the recess in which the disk is housed. These pipes are arranged to allow the gas to enter the cylinder and the products of combustion to pass outwardly when the exhaust and intake ports 15 and 16 in the valve disk register with the intake and exhaust ports in the cylinder.

These intake and exhaust ports 15 and 16 are positioned at 90° apart so that when the disk rotates at one half the speed of the engine shaft, the exhaust port and intake port of the cylinders will be successively opened and closed, this action allowing the cylinders to operate in their regular order. The exhaust and intake ports 15 and 16 are positioned at different radii from the center of the disk so as to register with the intake and exhaust ports on the cylinders which are disposed on opposite sides of the center of the cylinder.

Having detachable connection with the valve disk through a wedge connection 17 is a depending valve stem 18 which has its lower extremity provided with a bevel gear 19 which meshes with a bevel gear 20 keyed to the shaft of the engine, the diameters of the gears being two to one.

The numeral 21 designates a hood which is supported by the cylinders and houses the pipes 13 and 14 with the result that charges of gas will be heated previously to entering the cylinders for well known reasons.

It is to be noted that the parts are in close contact with the water circulating through the water jacket so that the parts are prevented from distortion which is caused by excessive heating.

From the foregoing description taken in connection with the accompanying drawing, the construction and mode of operation of the invention should be understood without a further extended description. Changes in the form, proportions and minor details of construction may be made within the scope of the claims without departing from the spirit or sacrificing any of the advantages of the invention.

What is claimed is:—

1. In combination with a pair of cylinders having intake and exhaust ports and a beveled annular wall encircling all of the ports, valve mechanism comprising a disk having ports adapted to register with the first mentioned ports and having its periphery beveled and resting upon said beveled wall, a plate covering said disk and secured to the cylinders means for driving said disk and inlet and outlet pipes threaded into said plate and bearing upon said disk and adapted to register with the ports in the disk during the rotation of the latter.

2. In combination with a pair of cylinders having intake and exhaust ports, and a beveled annular wall encircling all of the ports, valve mechanism comprising a disk having ports adapted to register with the first mentioned ports and having its periphery beveled and resting upon said beveled wall, a plate covering said disk and secured to the cylinders, means for driving said disk, and inlet and outlet pipes threaded into said plate at right angles to one face of said disk and each having one end bearing on said disk so as to register with the ports of the disk during the rotation of the latter.

In testimony whereof I affix my signature in presence of two witnesses.

BYRON E. STAVER.

Witnesses:
  LUKE F. BURNS,
  LYDA EGGEN.